(12) United States Patent
Hanna

(10) Patent No.: US 12,533,613 B2
(45) Date of Patent: Jan. 27, 2026

(54) TREATED FLOC CURTAINS

(71) Applicant: Clearflow Group Inc., Sherwood Park (CA)

(72) Inventor: Gerald Hanna, Sherwood Park (CA)

(73) Assignee: Clearflow Group Inc., Sherwood Park (CA)

( * ) Notice: Subject to any disclaimer, the term of this patent is extended or adjusted under 35 U.S.C. 154(b) by 810 days.

(21) Appl. No.: 17/627,755

(22) PCT Filed: Jul. 17, 2020

(86) PCT No.: PCT/CA2020/050998
§ 371 (c)(1),
(2) Date: Jan. 17, 2022

(87) PCT Pub. No.: WO2021/007681
PCT Pub. Date: Jan. 21, 2021

(65) Prior Publication Data
US 2022/0258083 A1     Aug. 18, 2022

Related U.S. Application Data

(60) Provisional application No. 62/875,935, filed on Jul. 18, 2019.

(51) Int. Cl.
*B01D 37/03*     (2006.01)
*B01D 21/00*     (2006.01)
(Continued)

(52) U.S. Cl.
CPC ......... *B01D 37/03* (2013.01); *B01D 21/0012* (2013.01); *B01D 21/01* (2013.01);
(Continued)

(58) Field of Classification Search
CPC .... B01D 37/03; B01D 21/0012; B01D 21/01; B01D 21/02; B01D 21/2433; C02F 1/001; C02F 1/5236; C02F 1/56; B03D 3/06
See application file for complete search history.

(56) References Cited

FOREIGN PATENT DOCUMENTS

CA        2662770 C     10/2016
JP        H-06246106 A   9/1994

OTHER PUBLICATIONS

First Examiners Requisition on CA App. 3,147,466 dated Nov. 10, 2022 (3 pages).

(Continued)

*Primary Examiner* — Thuan D Dang
(74) *Attorney, Agent, or Firm* — Foley & Lardner LLP

(57) ABSTRACT

An apparatus and method are provided for removing ultra fine sediment suspended in water where the apparatus includes a sheet of open weave textile material, such as jute, that has a polymer flocculant applied thereto to provide a floe curtain for the water to flow through such that the suspended sediment can contact the flocculant and precipitate out of the water. The sheet comprises a top edge and a bottom edge with a top border disposed along the top edge of the sheet and a bottom border disposed near the bottom edge of the sheet. The top border comprises a first plurality of spaced-apart grommets disposed therealong. The sheet further comprises a geotextile tube disposed between the bottom edge and the bottom border. Two or more floe curtains can be placed in a spaced-apart configuration in the water to provide stages of successive filtering as the water flows through the floe curtains.

21 Claims, 8 Drawing Sheets

(51) Int. Cl.
 *B01D 21/01* (2006.01)
 *C02F 1/00* (2023.01)
 *C02F 1/52* (2023.01)
 *C02F 1/56* (2023.01)

(52) U.S. Cl.
 CPC ............ *C02F 1/001* (2013.01); *C02F 1/5236* (2013.01); *C02F 1/56* (2013.01)

(56) References Cited

OTHER PUBLICATIONS

Notice of Allowance for CA App. 3,147, 466 dated May 11, 2023 (1 page).
Science Direct. "Fine Particle," Materials Science, (2025), 9 pages. Accessed at: https://www.sciencedirect.com/topics/materials-science/fine-particle.
Wikipedia. "Ultrafine particle," Wikipedia The Free Encyclopedia, (2025), 8 pages. Accessed at: https://en.wikipedia.org/wiki/Ultrafine_particle.

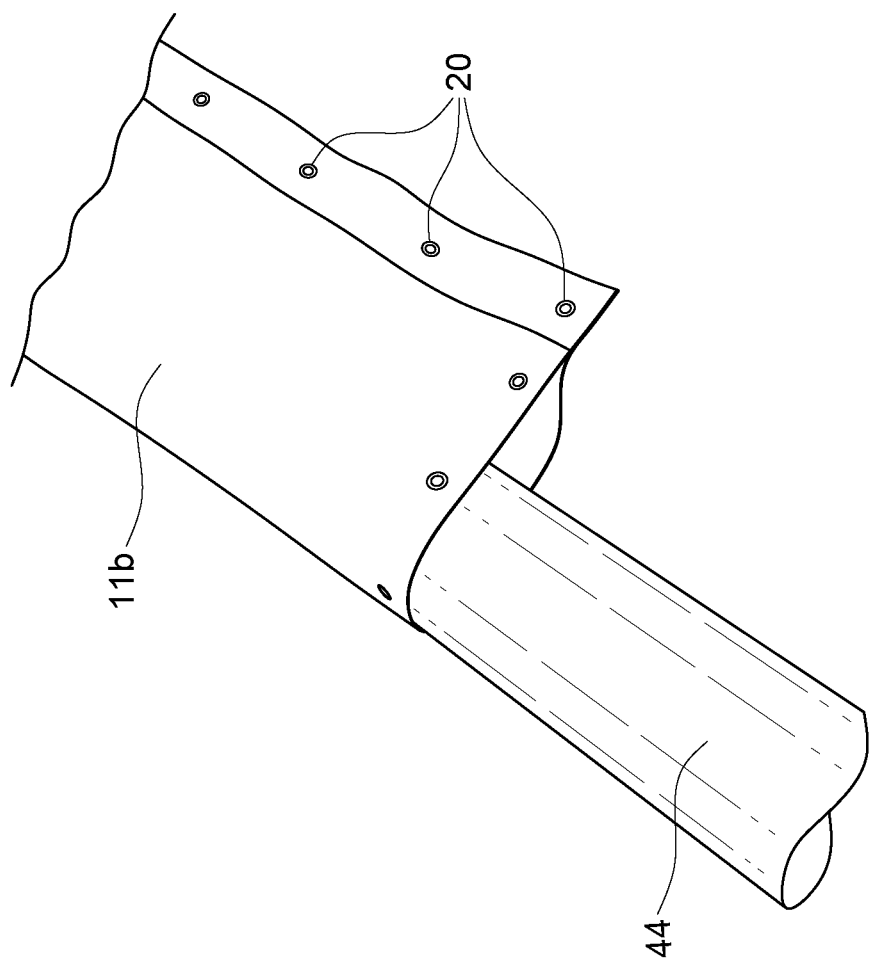

TREATED FLOC CURTAINS

CROSS-REFERENCE TO RELATED APPLICATIONS

This application is a U.S. National Phase application of International Application No. PCT/CA2020/050998 filed 17 Jul. 2020, which claims priority of U.S. provisional patent application Ser. No. 62/875,935 filed 18 Jul. 2019 which is incorporated by reference into this application in its entirety.

TECHNICAL FIELD

The present disclosure is related to the field of apparatuses and methods for polishing ultra-fines from water, in particular, natural fibre textile materials treated with a polymer flocculant.

BACKGROUND

Water and liquids used in construction, industrial, mining and well drilling operations can contain suspended solids after being used. In some instances, governmental laws and regulations can require that the removal of the suspended solids must be carried out before the water or liquids can be introduced into the environment. In other instances, the recovery of the liquids, once the solids have been removed, can reduce the costs of the operation by re-using the liquids instead of discarding the liquids and using new or fresh liquids at a higher cost.

Wastewater and sewage can contain suspended solids. In some instances, governmental laws and regulations can require that the removal of the suspended solids must be carried out before the water or liquids can be introduced into the environment. In other instances, the recovery of the liquids, once the solids have been removed, can reduce the costs of the operation by re-using the liquids instead of discarding the liquids and using new or fresh liquids at a higher cost.

In some instances, the wastewater from industrial and mining processes, in addition to sewage, can find its way into bodies of water and flowing waterways, such as streams, rivers, ponds, lakes and oceans.

U.S. Pat. No. 3,085,916 issued to Zimmie et al. on Apr. 16, 1963 describes a method of flocculating and preventing the accumulation of solids or silt in cooling systems by introducing water-soluable polyelectrolytic organic polymers into aqueous cooling systems.

U.S. Pat. No. 3,860,526 issued to Corbett on Jan. 14, 1975 describes a solid flocculant that can be placed into an effluent stream or body of water to release flocculant into the stream or water at a controlled rate.

U.S. Pat. No. 5,720,886 issued to Iwinski on Feb. 24, 1998 describes a process for using polymer to remove dissolved and particulate metal from mine wastewater. U.S. Pat. No. 5,795,620 issued to Iwinski on Aug. 18, 1998 describes the coating of waste rock with polymer to retard the leaching of metal from the waste rock.

The shortcomings of the prior art are that they do not provide a cost-effective and efficient method of flocculating or settling of solids suspended in liquids. In addition, the prior art concerning wastewater treatment systems does not provide a cost-effective and efficient method of flocculating or settling of solids suspended in liquids, as these prior art methods and systems can take 2 to 5 weeks to clarify water using microbial reactions.

The contaminants discussed above can be found in flowing waterways as well as standing bodies of waters. Contaminated water can be clarified by placing flocculation systems containing flocculants therein, whereby the flocculant materials can dissolve in the water and interact with the contaminants to allow them to precipitate out.

Water treated in this manner, however, can still contain suspended ultra-fine sediment. Fine particles are generally considered to be 100-2500 nm in diameter (www.sciencedirect.com/topics/materials-science/fine-particle.) whereas ultra-fine particles are generally considered to be 100 nm or less in diameter (www.sciencedirect.com/topics/materials-science/fine-particle and https://en.wikipedia.org/wiki/Ultrafine particle).

It is, therefore, desirable to provide a mechanism for removing ultra-fine sediments from water.

SUMMARY

An apparatus and methods for treating water containing suspended ultra-fine sediment is provided. In some embodiments, the apparatus can comprise a sheet of an open-weave natural fibre textile treated with a polymer flocculant. In some embodiments, the natural fibre can comprise a biodegradable material. In some embodiments, the flocculant can comprise a Lynx™ polymer as manufactured by Clearflow Group Inc. of Sherwood Park, Alberta, Canada.

In some embodiments, the textile sheet can comprise a fabric, such as jute or other similar natural or synthetic material as well known to those skilled in the art that is configured to permit water to flow therethrough and act as a filter. In some embodiments, a flocculant composition can be further disposed in the filtration device to form a flocculation curtain or "floc curtain". The floc curtain can further provide a screening or filtering action to catch solids in the water as well as providing another means for flocculant to dissolve and mix with the contaminated water.

In some embodiments, the flocculant composition used in the cage can comprise a polymer, a soluble salt of a group IA metal or of a group IIA metal of the periodic table, and water. In other embodiments, the soluble salt of a group IA metal or the soluble salt of a group IIA metal can be formed by combining a salt of a group IA metal or a salt of a group IIA metal with a mineral acid or an organic acid.

In some embodiments, the flocculant composition can be manufactured by first combining the polymer and the alkaline earth metal soluble salt, and then adding the water.

In some embodiments, the floc curtain can comprise a float attached to a top edge or border thereof to enable the floc curtain to hang downwards from the surface of a body of water. In some embodiments, the floc curtain can comprise a geotextile tube attached to a bottom edge or border thereof to permit a chain or weighted cable or other weighting device as known to those skilled in the art to be placed in the geotextile tube to provide means for weighting the bottom edge of the floc curtain thereby enabling the floc curtain to maintain a substantially vertical configuration while suspended in the body of water.

In some embodiments, two or more floc curtains can be placed in a spaced-apart configuration in the body of water to provide sequential filtering stages as water flows through each successive floc curtain.

In some embodiments, an apparatus can be provided for removing ultra-fine sediment suspended in water, the apparatus comprising: a sheet of open-weave textile material, the sheet comprising a top edge and a bottom edge; a top border disposed along the top edge of the sheet, and a bottom border disposed near the bottom edge of the sheet, the top border comprising a first plurality of spaced-apart grommets disposed therealong; a geotextile tube disposed between the bottom edge and the bottom border; and a flocculant composition disposed in the open-weave textile material.

Broadly stated, in some embodiments, the flocculant composition can comprise: a polymer flocculant comprising a high molecular weight, in a proportion of approximately 10% to 70% by weight; a soluble salt of a group IA metal or a soluble salt of a group IIA metal, in a proportion of approximately 0.5% to 35% by weight; and water, in a proportion to make up a balance of 100% weight.

Broadly stated, in some embodiments, the textile material can comprise a biodegradable material.

Broadly stated, in some embodiments, the biodegradable material can comprise jute.

Broadly stated, in some embodiments, the textile material can comprise a Leno weave.

Broadly stated, in some embodiments, the geotextile tube can comprise a pull string disposed therethrough.

Broadly stated, in some embodiments, the apparatus can further comprise a chain or weighted cable configured to be pulled into the geotextile tube with the pull string.

Broadly stated, in some embodiments, the apparatus can further comprise a float configured to be attached to the first plurality of spaced-apart grommets.

Broadly stated, in some embodiments, the bottom border can further comprise a second plurality of spaced-apart grommets disposed therealong.

Broadly stated, in some embodiments, the apparatus can further comprise a second apparatus, as described above, attached to the second plurality of spaced-apart grommets.

Broadly stated, in some embodiments, a method can be provided for removing ultra fine sediment suspended in water, the method comprising an apparatus, as described above, in a body of water.

Broadly stated, in some embodiments, the method can further comprise placing two or more of the apparatus described above in a spaced-apart configuration in the body of water.

Broadly stated, in some embodiments, the method can further comprise placing a chain or weighted cable in the geotextile tube of the apparatus described above.

BRIEF DESCRIPTION OF THE DRAWINGS

FIG. 1b is a side elevation view depicting one embodiment of a float for the floc curtain of FIG. 1a.

FIG. 2 is an exploded elevation view depicting the lower edge of the floc curtain of FIG. 1a.

FIG. 3a is a photograph depicting one embodiment of the floc curtain of FIG. 1a.

FIG. 3b is a photograph depicting one embodiment of the float of the floc curtain of FIG. 1a.

FIG. 4 is a macro view photograph depicting the weave of the floc curtain of FIG. 3a.

DETAILED DESCRIPTION OF EMBODIMENTS

Figure 1A:
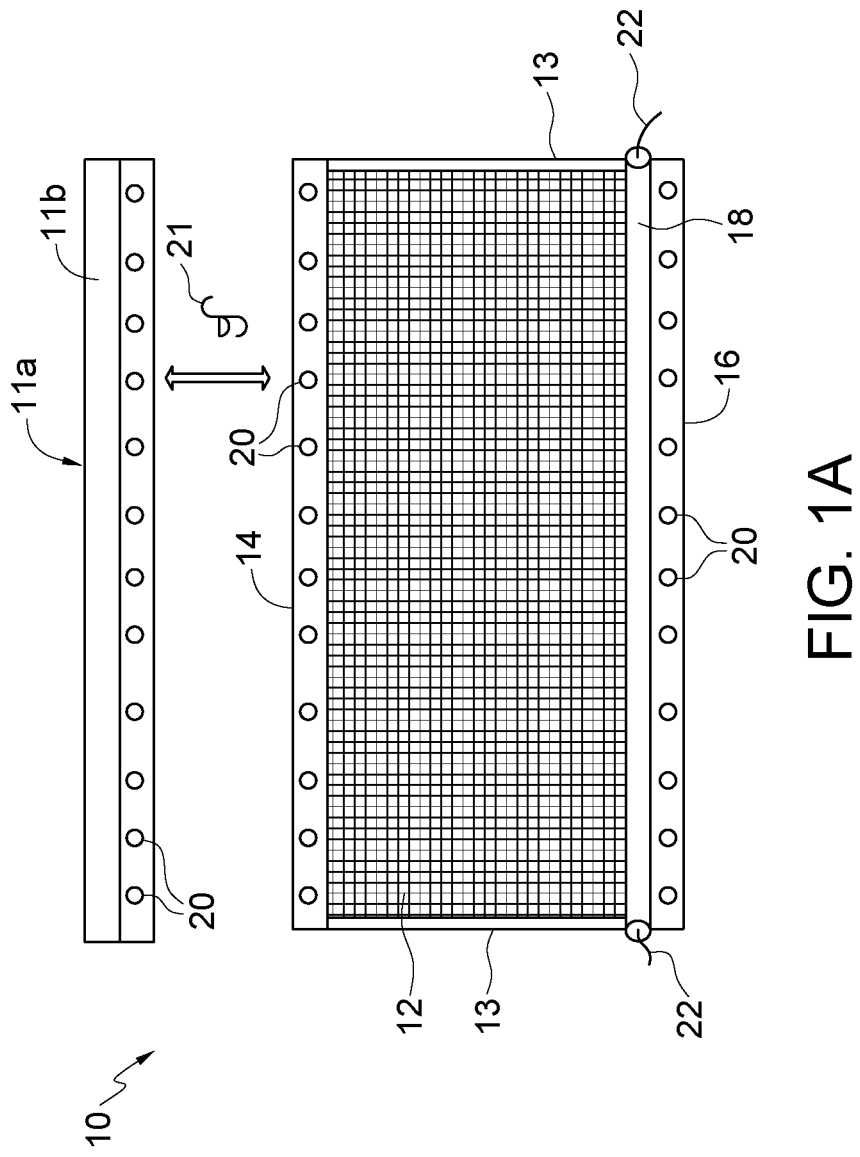
FIG. 1a is a side elevation view depicting one embodiment of a floc curtain.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

In some embodiments, a floc curtain can be provided comprising an open-weave textile material with a polymer flocculant disposed thereon or impregnated therein for flocculating ultra fine solids or sediment suspended in liquids. The composition can be a flocculant in solid or gelatinous form that can dissolve into liquids. When liquids containing suspended solids contact the composition, the composition can dissolve thereby releasing flocculant into the liquid to contact the suspended solids. The suspended solids, having been contacted with the flocculant, can clump together and then settle from the liquids.

In some embodiments, the composition can comprise a polymer or polymeric flocculant, which can further comprise a macromolecular organic component and have a high molecular weight. Suitable examples can include those described in U.S. Pat. Nos. 3,085,916 and 3,860,526. The proportion of the polymer in the composition can be in the range of approximately 10% to 70% by weight. The composition can further comprise any suitable soluble salt of a group IA metal or of a group IIA metal of the periodic table as well known to those skilled in the art, the proportion of which can be in the range of approximately 0.5% to 35% by weight. Examples of suitable soluble salts can include those disclosed in the above-mentioned patents. The balance of the composition can comprise water to make up the 100% weight.

In some embodiments, the soluble salt of a group IA metal or of a group IIA metal of the periodic table can be a combination of any suitable salt of a group IA metal or of a group IIA metal of the periodic table as well known to those skilled in the art, such as those metals that appear in columns IA or IIA of the chemical periodic table, as well known to those skilled in the art, with any suitable organic or mineral acid as well known to those skilled in the art. Suitable examples can include sulphuric acid, hydrochloric acid and nitric acid as mineral acids, whereas suitable organic acids can include acetic acid, boric acid, citric acid and formic acid. Other suitable mineral or organic acids can include those described in U.S. Pat. Nos. 3,085,916 and 3,860,526, the suitable selection of which can obviously be determined by those skilled in the art. The balance of the composition can comprise water to make up the 100% weight.

In some embodiments, the composition can be manufactured by first combining the polymer and the salt of a group IA metal or of a group IIA metal of the periodic table, both of which can be in solid granular or powder form, and then mixing them with the organic or mineral acid and water. In other embodiments, the salt of a group IA metal or of a group IIA metal of the periodic table can be mixed with the acid and water, and then add the polymer to the mixture.

In further embodiments, the composition can be manufactured by first combining the polymer with the soluble salt of group IA metal or of a group IIA metal of the periodic table, and then adding the balance of water. In yet further embodiments, the composition can be manufactured by first mixing the soluble salt of a group IA metal or of a group IIA metal of the periodic table with the water, and then adding the polymer.

In any of the manufacturing methods described herein, the resultant mixtures of the components of the composition can then react with each other, which can further result in the mixture setting or curing into a solid or gelatinous form. Once the components of the composition have been mixed together, there can be a working time ranging from anywhere from approximately 2 to 10 minutes to affix the shape of the composition after which the shape composition can become set or cured.

In terms of the methods of manufacture relating to whether the last component added to the mixture to form the composition is water or the polymer, it has been observed that the choice of which can result in the polymer being more soluble or less soluble. For example, if the water is the last component added to a mixture of polymer and salt of a group IA metal or of a group IIA metal of the periodic table, it is observed that the resulting composition is less soluble in terms of releasing the polymer. If the polymer is the last component added to a mixture of the soluble salt of a group IA metal or of a group IIA metal of the periodic table, it is observed that the resulting composition is more soluble in terms of releasing the polymer. The choice of manufacture can be made in respect of the application for the composition. If the composition is to be used in a closed-loop system where liquids are re-circulated through the composition, then using a composition whose polymer is less soluble may be preferable to prevent the composition being consumed or dissolved too rapidly. If the composition is to be used in an open-loop system where liquids pass through the composition once, then using a composition whose polymer is more soluble may be preferable to introduce the polymer into the liquids at a predetermined or desired rate.

In some embodiments, the open-weave textile material can comprise a natural jute fiber material that can further be 100 percent bio-degradable, which can, typically, last for one to two seasons.

In some embodiments, by utilizing this design, the floc curtain can be provided a first time including a float wherein each replacement curtain would not need another float, which can reduce operating costs and waste sent to landfill once the life cycle of the curtain is spent.

In some embodiments, the geotextile tube opening near the bottom part of the curtain can be used to hold a weight of some description such as a chain or heavy cable. This weight can allow the curtain to maintain a substantially vertical configuration against a flow of water to maintaining efficiency for polishing the water.

In some embodiments, the geotextile material on the top of the floc curtain can comprise a plurality of spaced-apart grommets in place to allow for ease of connection and removal to and from the upper float.

In some embodiments, the geotextile material on the bottom of the floc curtain can comprise a plurality of spaced-apart grommets in place to allow for ease of connection to an additional level(s) of floc curtain(s) to increase the height of the floc curtain to accommodate for larger depths of the body of water, as required.

In some embodiments, the open weave of the jute material can allow the water containing suspended particles to flow therethrough, and the fiber cilia or hairs from the jute material can allow for larger surface areas beyond just the cord of the material itself. The larger treated surface area can provide more attachment capability.

In some embodiments, the jute fiber material can be treated with Lynx™ polymer (as manufactured by Clearflow Group Inc. of Sherwood Park, Alberta, Canada) of a specific charge density to accommodate for the attachment of suspended solids. This treatment ratio is very specific. In some embodiments, the polymer flocculant can comprise one or more of: a co-polymer of acrylamide and sodium acrylate (anionic polyacrylamide), a homopolymer comprising polyacrylamide (non-ionic polymer), and a co-polymer of acrylamide and one or more of the following: diallyldimethylammonium chloride, acryloyloxyethyltrimethylammonium chloride, and methacryloyloxyethyltrimethylammonium chloride (cationic polyacrylamides). In some embodiments, the polymer can comprise any flocculant, as selected by those skilled in the art who know how to match water and sediment chemistry to a flocculant. In some embodiments, the flocculant could, therefore, comprise any charge density, wherein the polymer can have a long molecule chain (ie. high molecular weight) on the order of 1,000,000 Daltons or larger and can further comprise a molecular structure that is linear or branched. In some embodiments, when the molecular weight of the polymer is high, greater than 1,000,000 Daltons, the polymer can remain attached to the jute, and when the molecular structure is linear or branched, the polymer can perform as a flocculant or binder. If, on the other hand, the molecular structure of the polymer is cross-linked, then the polymer simply acts as an absorbent and does not have any real binding capability.

In some embodiments, the jute floc curtain can be made long enough to accommodate more than one level of polishing depending on the width of the water body.

In some embodiments, once the water has passed through the initial portion of the floc curtain, then the water can flow through a successive number of floc curtains to provide adequate polishing of solids suspended in the water. In some embodiments, a multiple number of 10 meter long curtains, as an example, could be positioned from side to side of the water body to accommodate its width.

In some embodiments, the floc curtain can be easily installed, and provide a passive treatment of the water (meaning, no energy inputted to the floc curtain is required), which can provide an economical and 100 percent environmentally friendly solution to removed suspended solids from the water.

In some embodiments, the upper float and floc curtain mechanism can be tied off to an object adjacent to the water body, such as a tree, to anchor the floc curtain and ensure proper polishing and to minimize cost.

Figure 2:
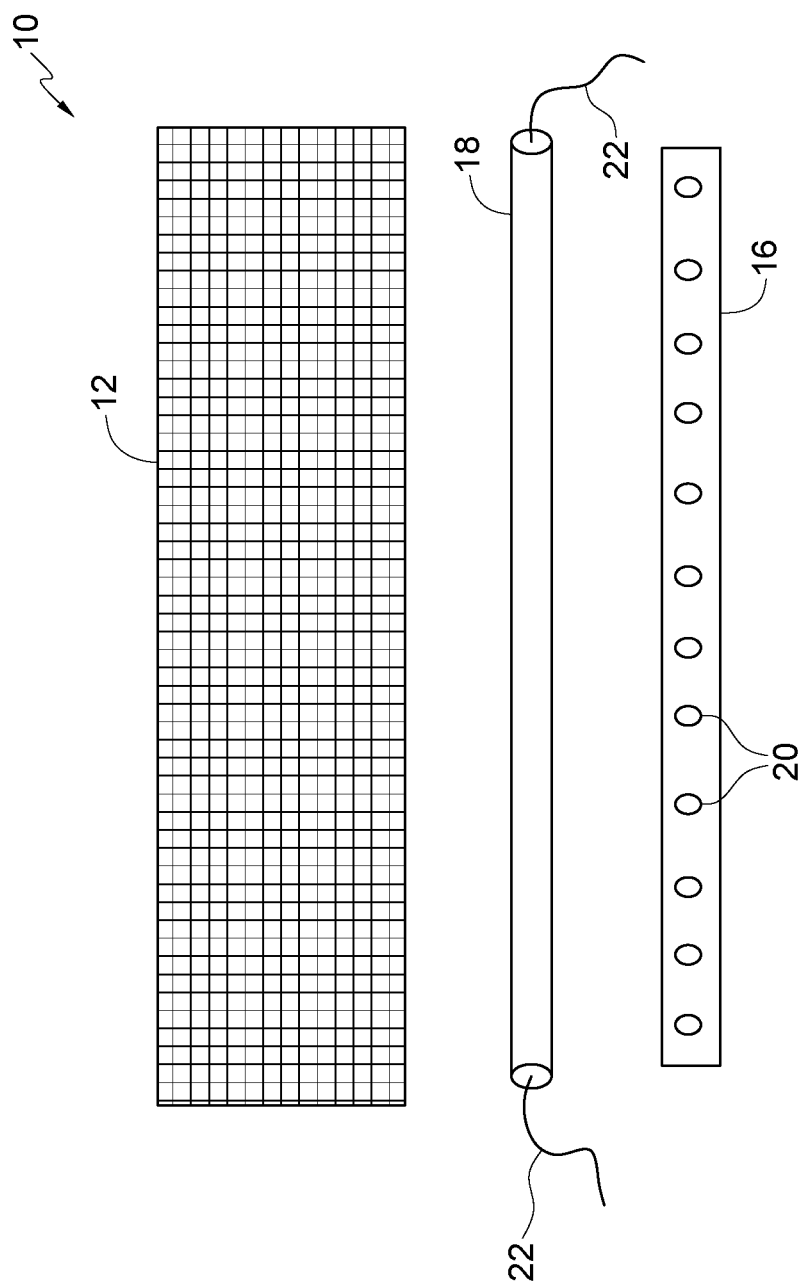

Referring to FIGS. 1a and 2, one embodiment of floc curtain 10 is shown. In some embodiments, floc curtain 10 can comprise open-weave textile sheet 12. Sheet 12 can be comprised of jute with openings measuring approximately 2.5 cm by 2.5 cm. In some embodiments, sheet 12 can be 10 metres wide by 1.22 metres high, although the dimensions of sheet 12 can be selected as required, as determined by those skilled in the art. In some embodiments, floc curtain 10 can comprise top border 14 disposed along a top edge thereof, wherein top border 14 can comprise a 10 cm high sewn piece of synthetic geotextile material. In some embodiments, top border 14 can comprise a plurality of spaced-apart grommets 20 disposed therealong, where the spacing between grommets 20 can be 16 cm. In some embodiments, floc curtain 10 can comprise bottom border 16 disposed near a bottom edge thereof, wherein bottom border 16 can comprise a 10 cm high sewn piece of synthetic geotextile material. In some embodiments, bottom border 16 can comprise a plurality of spaced-apart grommets 20 disposed therealong, where the spacing between grommets 20 can be 16 cm. In some embodiments, floc curtain 10 can comprise geotextile tube 18 disposed between sheet 12 and bottom border 16, thereby attaching bottom border 16 to floc curtain 10. In some embodiments, geotextile tube 18 can comprise a 5 cm opening, further comprising pull string 22 disposed therethrough. In some embodiments, floc curtain 10 can comprise side edging 13 disposed along the vertical sides of sheet 12 to prevent the edges of sheet 12 from fraying. In some embodiments, floc curtain 10 can comprise float 11a, which can further comprise sleeve 11b having a plurality of grommets 20 disposed along a lower edge thereof to facilitate the coupling of float 11a to top border 14 using a plurality of connectors 21. In some embodiments, connector 21 can comprise a fastener, such as a carabiner or like device, to facilitate easy attachment and removal of float 11a to and from top border 14.

Figure 1B:
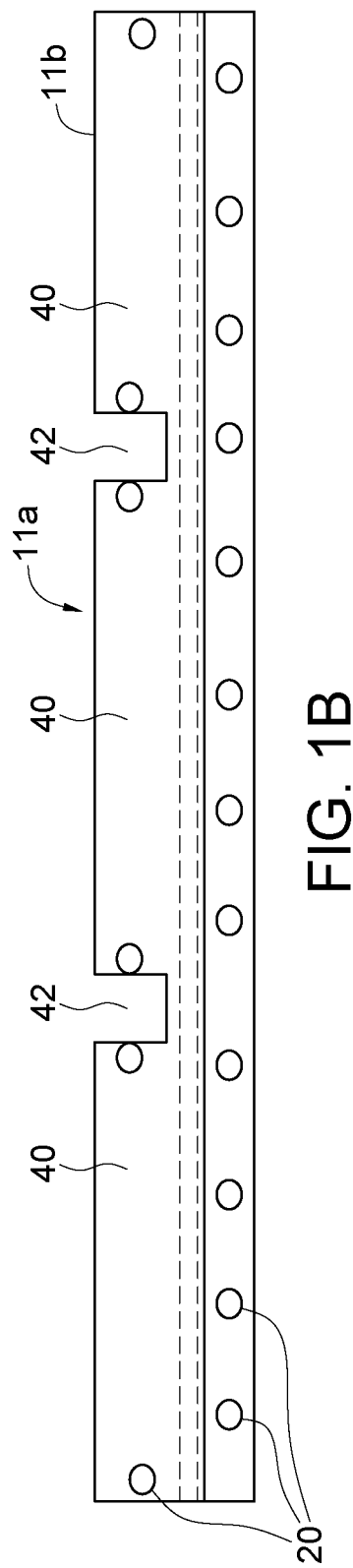
Figure 1C:
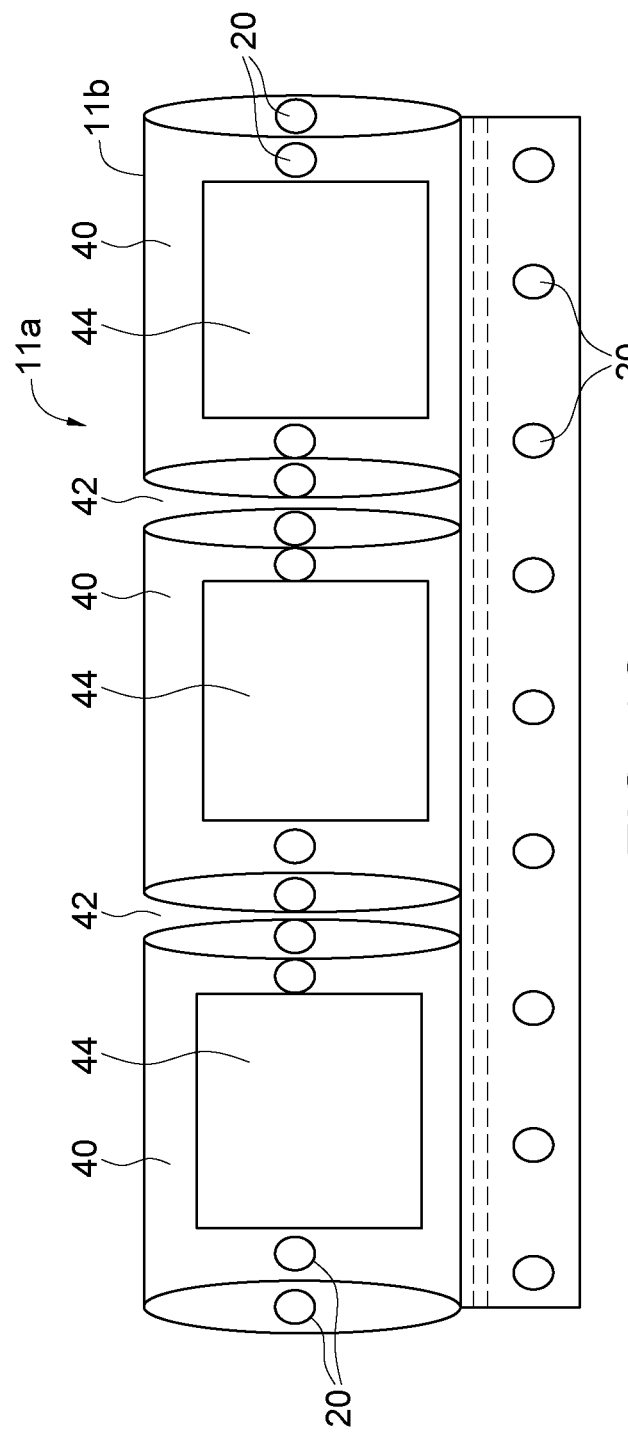
FIG. 1c is a side elevation view depicting another embodiment of the float of FIG. 1b.

Referring to FIGS. 1b and 1c, one embodiment of float 11a is shown. In some embodiments, float 11a can comprise a plurality of top sections 40 separated therebetween by gap 42. In some embodiments, float 11a can comprise of tubular sleeve 11b configured to have an individual float 44 disposed in each top section 40. In some embodiments, float 44 can comprise an extruded polystyrene foam float material such as Styrofoam®, or other such material configured to provide buoyancy to float 11a so as to support sheet 12 when placed in a body of water. In a representative embodiment, an individual float 11a can be approximately 10 metres long with three top sections 42 each having a length of approximately 3 metres long with gap 42, being approximately 150 mm wide, disposed between adjacent top sections 40. In some embodiments, tubular sleeve 11b of float 11a can be approximately 250 mm in diameter.

Figure 3A:
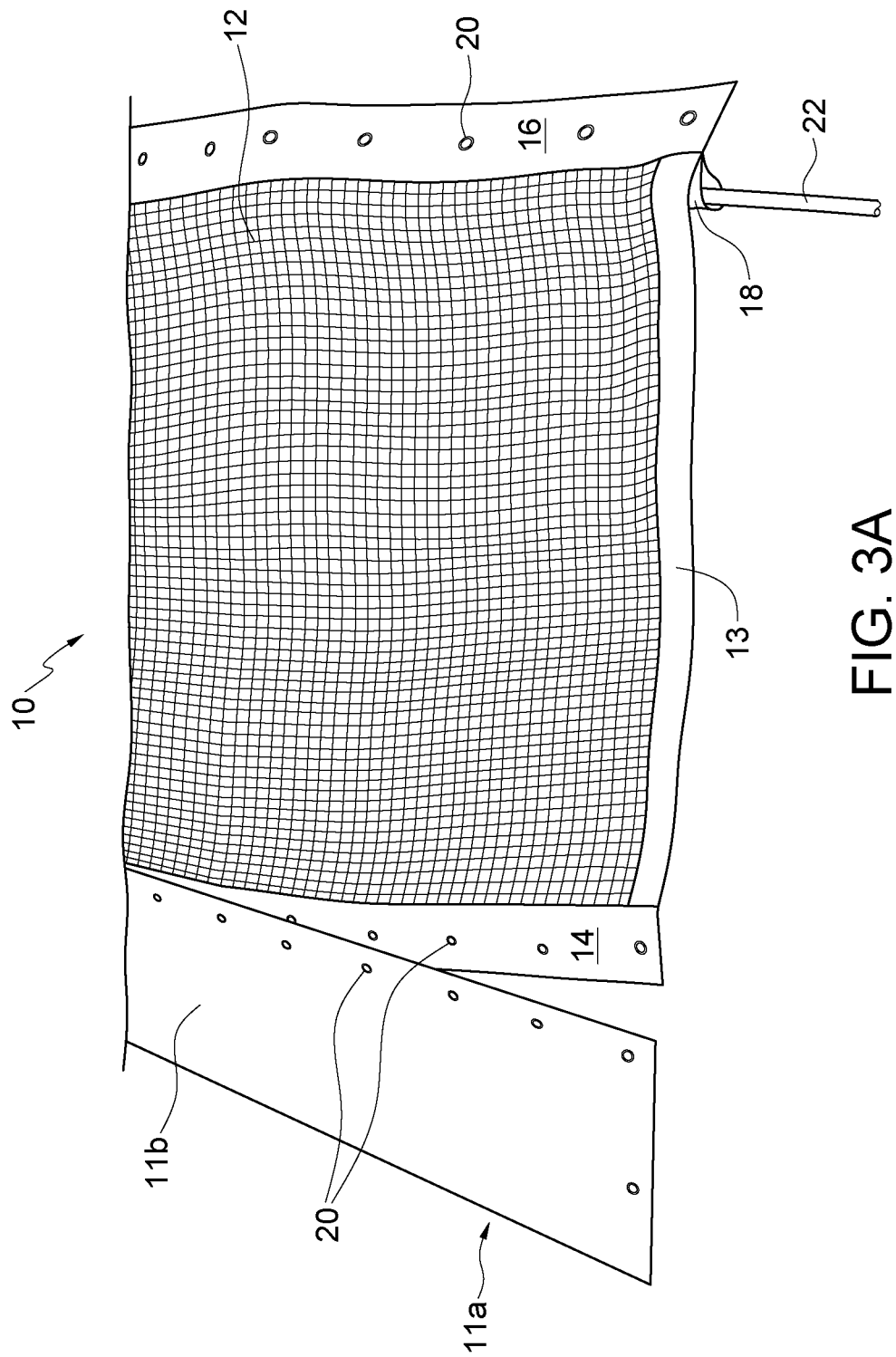
Figure 4:
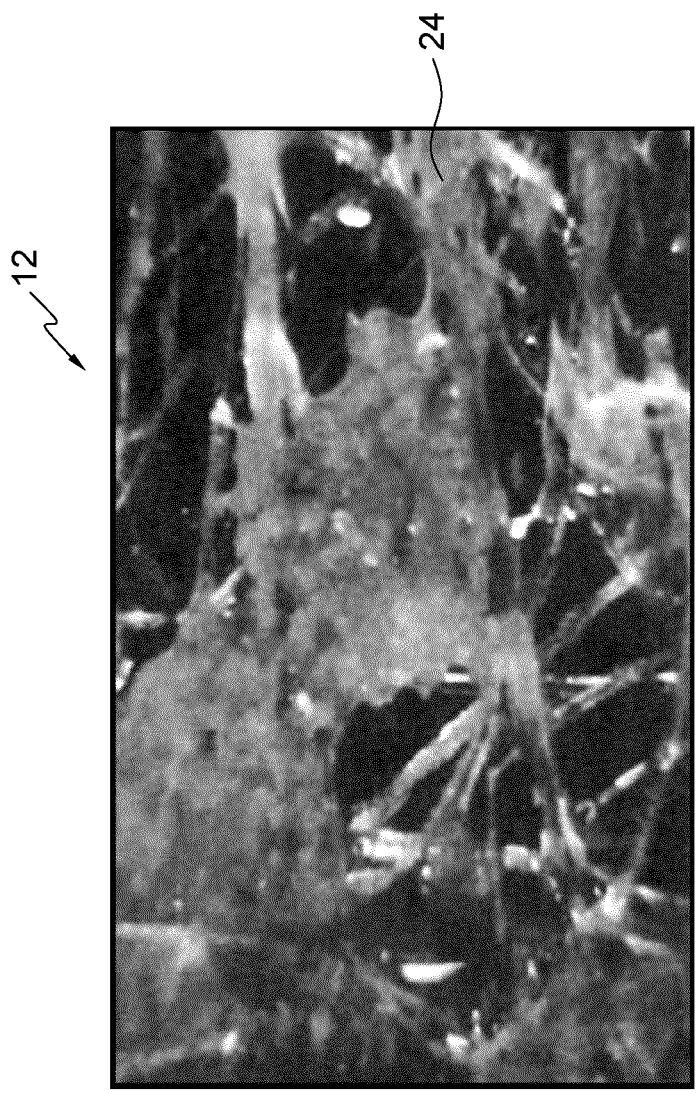

Referring to FIG. 3a, a photograph of one embodiment of floc curtain 10 is shown. Referring to FIG. 3b, a photograph of one embodiment of top border 14 is shown. Referring to FIG. 4, a macro photograph of polymer flocculant 24 impregnated in sheet 12 is shown. In some embodiments, polymer flocculant 24 can be comprised in a granulated or powered form that can be attached to sheet 12. In other embodiments, polymer flocculant 24 can comprise a gelatinous form.

Figure 5:
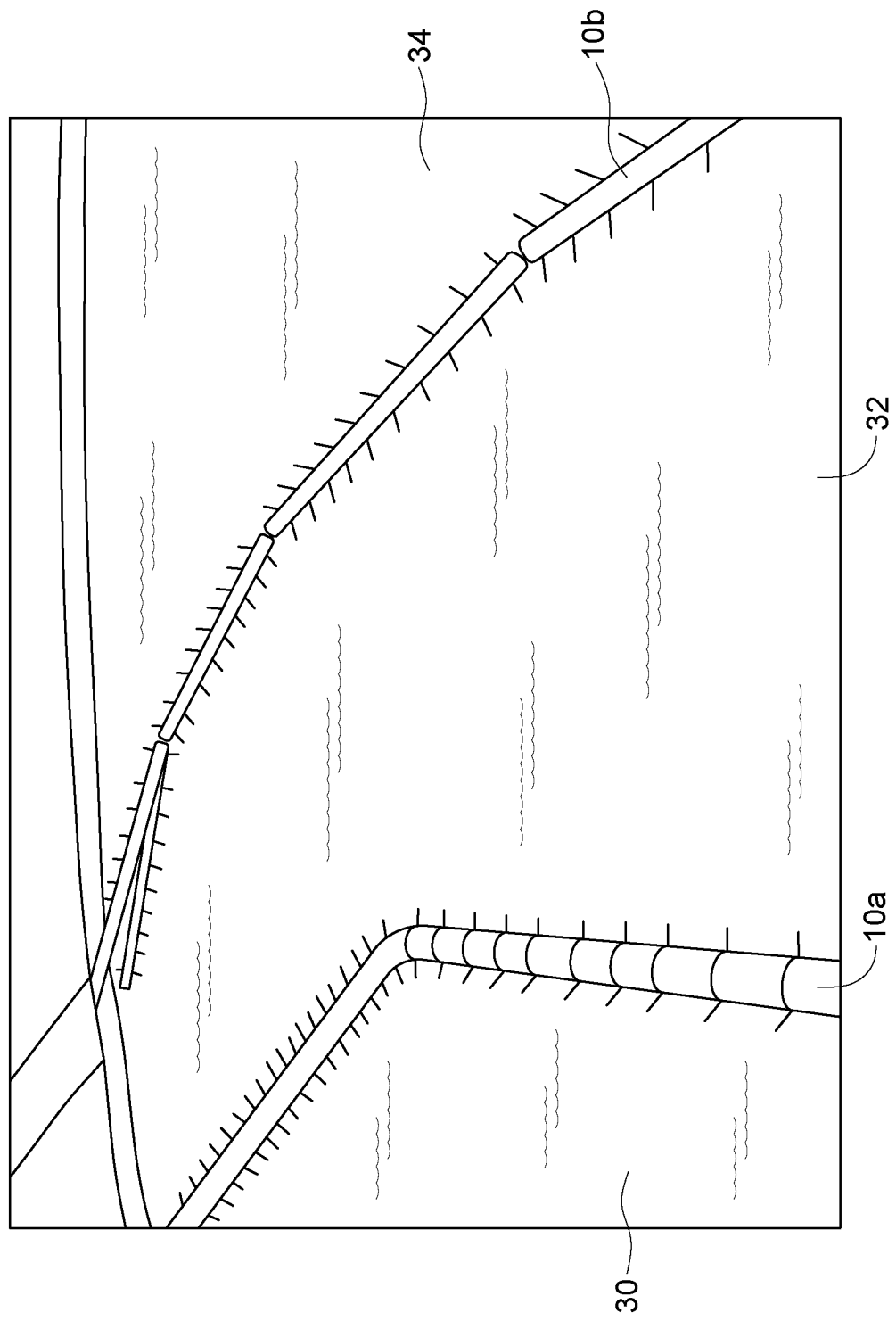
FIG. 5 is a photograph depicting the placement of two of the floc curtains of FIG. 1 in a body of water.

Referring to FIG. 5, an example of successive floc curtains 10 to provide stage filtering is shown. A first plurality of floc curtains can be assembled side to side to form floc curtain 10a across a water body, whereas a second plurality of floc curtains can be assembled side to side to form floc curtain 10b across the water body. Water in reservoir 30 can flow through floc curtain 10a to provide a first stage of filtering or polishing of the water before entering reservoir 32. Water in reservoir 32 can then flow through floc curtain 10b to provide a second stage of filtering or polishing of the water before entering reservoir 34.

Figure 6:
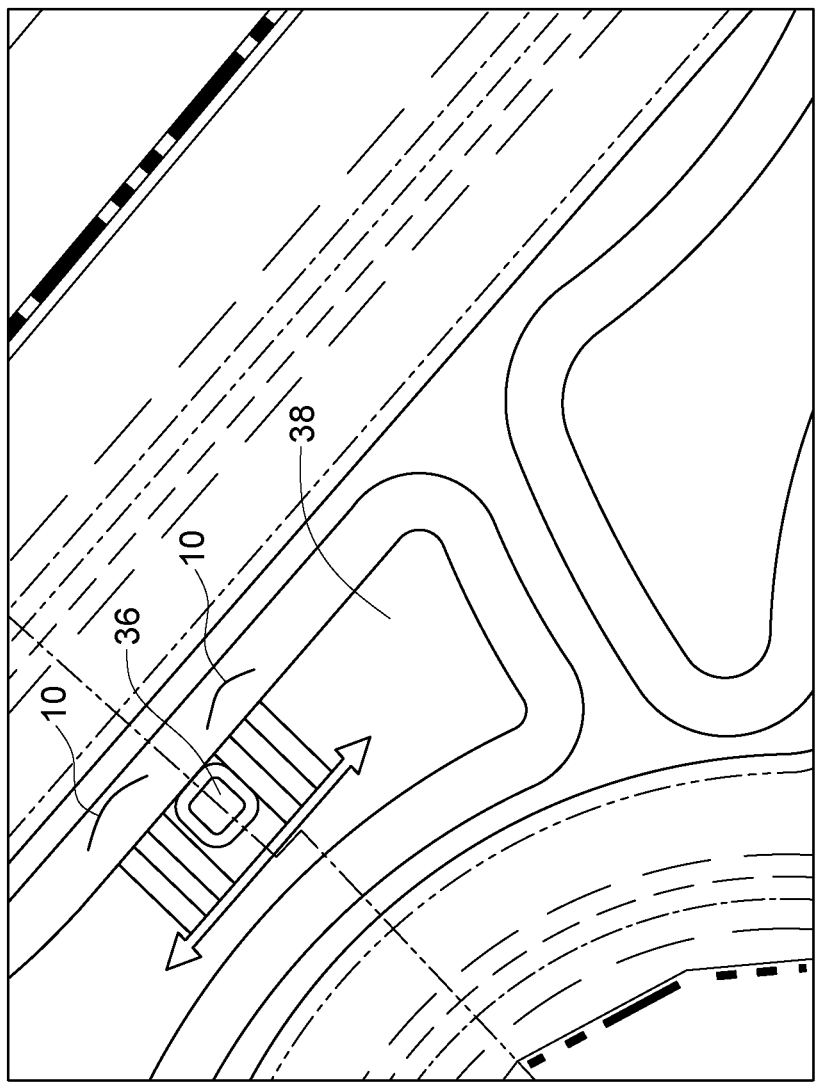
FIG. 6 is a top plan view depicting the placement of multiple floc curtains of FIG. 1 adjacent to an outlet of a water treatment facility.

Referring to FIG. 6, another example of the application of multiple floc curtains 10 to polish water from a water treatment facility is shown. In this example, water exiting the treatment facility from outlet 36 can pass through multiple spaced-apart floc curtains 10 at pre-determined distances before entering reservoir 38 to polish or remove ultra fine solids or sediment from the water. In a representative embodiment, the first of the multiple floc curtains 10 can be placed approximately 3 metres from outlet 36, wherein the next of the remainder of the floc curtains 10 can be placed approximately 1 metre from the first floc curtain 10, and wherein the remainder of the floc curtains 10 can be spaced approximately 1 metre apart thereafter.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. An apparatus for removing ultra-fine sediment suspended in water, the apparatus comprising:
    a) a sheet of open-weave textile material, the sheet comprising a top edge and a bottom edge, the sheet of open-weave textile material configured for the water to pass therethrough;
    b) a top border disposed along the top edge of the sheet, and a bottom border disposed near the bottom edge of the sheet, the top border comprising a first plurality of spaced-apart grommets disposed therealong;
    c) a geotextile tube disposed between the bottom edge and the bottom border; and
    d) a flocculant composition disposed in the open-weave textile material, wherein the water contacts the flocculant composition as the water passes through the sheet of open-weave textile material for a passive treatment thereof.

2. The apparatus as set forth in claim 1, wherein the flocculant composition comprises:
    a) a polymer flocculant comprising a high molecular weight, in a proportion of approximately 10% to 70% by weight;
    b) a soluble salt of a group IA metal or a soluble salt of a group IIA metal, in a proportion of approximately 0.5% to 35% by weight; and
    c) water, in a proportion to make up a balance of 100% weight.

3. The apparatus as set forth in claim 1, wherein the textile material comprises a biodegradable material.

4. The apparatus as set forth in claim 3, wherein the biodegradable material comprises jute.

5. The apparatus as set forth in claim 1, wherein the textile material comprises a Leno weave.

6. The apparatus as set forth in claim 1, wherein the geotextile tube comprises a pull string disposed therethrough.

7. The apparatus as set forth in claim 6, further comprising a chain or weighted cable configured to be pulled into the geotextile tube with the pull string.

8. The apparatus as set forth in claim 1, further comprising a float configured to be attached to the first plurality of spaced-apart grommets.

9. The apparatus as set forth in claim 1, wherein the bottom border further comprises a second plurality of spaced-apart grommets disposed therealong.

10. The apparatus as set forth in claim 9, further comprising a second apparatus of claim 1 attached to the second plurality of spaced-apart grommets.

11. A method for removing ultra fine sediment suspended in water, the method comprising placing an apparatus in a body of water and passing the water through the apparatus in a passive manner, the apparatus comprising:

a) a sheet of open-weave textile material, the sheet comprising a top edge and a bottom edge, the sheet of open-weave textile material configured for the water to pass therethrough;
b) a top border disposed along the top edge of the sheet, and a bottom border disposed near the bottom edge of the sheet, the top border comprising a first plurality of spaced-apart grommets disposed therealong;
c) a geotextile tube disposed between the bottom edge and the bottom border; and
d) a flocculant composition disposed in the open-weave textile material, wherein the water contacts the flocculant composition as the water passes through the sheet of open-weave textile material for a passive treatment thereof.

12. The method as set forth in claim 11, further comprising placing two or more of the apparatus in a spaced-apart configuration in the body of water.

13. The method as set forth in claim 11, wherein the flocculant composition comprises:
a) a polymer flocculant comprising a high molecular weight, in a proportion of approximately 10% to 70% by weight;
b) a soluble salt of a group IA metal or a soluble salt of a group IIA metal, in a proportion of approximately 0.5% to 35% by weight; and
c) water, in a proportion to make up a balance of 100% weight.

14. The method as set forth in claim 11, wherein the textile material comprises a biodegradable material.

15. The method as set forth in claim 14, wherein the biodegradable materials comprises jute.

16. The method as set forth in claim 11, wherein the textile material comprises a Leno weave.

17. The method as set forth in claim 11, wherein the geotextile tube comprises a pull string disposed therethrough.

18. The method as set forth in claim 17, further comprising pulling a chain or weighted cable through the geotextile tube with the pull string.

19. The method as set forth in claim 11, further comprising attaching a float to the first plurality of spaced-apart grommets.

20. The method as set forth in claim 11, wherein the bottom border further comprises a second plurality of spaced-apart grommets disposed therealong.

21. The method as set forth in claim 20, further comprising attaching a second apparatus of claim 11 to the second plurality of spaced-apart grommets.

\* \* \* \* \*